United States Patent [19]
Wright

[11] Patent Number: 6,029,418
[45] Date of Patent: Feb. 29, 2000

[54] WIRE CLIP MOUNTING SYSTEM FOR STRUCTURAL PANELS

[76] Inventor: John T. Wright, 19 Kratz Rd., Harleysville, Pa. 19438

[21] Appl. No.: 09/109,396

[22] Filed: Jul. 2, 1998

[51] Int. Cl.$^7$ ............................... E04B 1/38; E04B 2/00
[52] U.S. Cl. ..................... 52/745.1; 52/745.09; 52/712; 52/698; 52/587.1; 52/506.05; 52/506.08; 52/512; 403/210
[58] Field of Search ........................... 52/745.12, 745.1, 52/745.09, 742.16, 587.1, 582.1, 712, 698, 506.05, 506.08, 512; 403/210, 209, 206; 411/400, 401, 383

[56] References Cited

U.S. PATENT DOCUMENTS

| | | | |
|---|---|---|---|
| 2,117,198 | 5/1938 | McGee | 52/506.05 |
| 2,881,304 | 4/1959 | Dobson et al. | 219/78.12 |
| 3,144,261 | 8/1964 | Stephens | 411/401 X |
| 3,722,160 | 3/1973 | Bentley | 52/512 X |
| 5,138,809 | 8/1992 | Saikachi | 52/512 X |
| 5,657,602 | 8/1997 | Hellander | 52/446 |

*Primary Examiner*—Beth Aubrey
*Assistant Examiner*—Brian E. Glessner
*Attorney, Agent, or Firm*—Evelyn M. Sommer

[57] ABSTRACT

For mounting a structural panel to a wall, a wire clip is provided having a bail portion formed in an annular shape for insertion of a fastener element and fastening into an anchor member of the wall, and an arm portion extending from the bail portion having a linear shape for insertion into the inner core of the panel at an exposed lateral edge. The bail portion is offset from the arm portion both in a lateral direction and in a thickness direction of the panel so as to position the bail portion toward the wall anchor member when the arm portion is inserted into the inner core of the panel. The invention also includes the related method for mounting a structural panel to a wall using the wire clip device. In the preferred method, the panel is of the type having outer metal face sheets adhesively bonded to an inner plastic corrugated core formed with undulating corrugation spaces into which the arm portions of the wire clips are inserted. For mounting adjacent panels at a joint, respective sets of wire clips have their arm portions inserted into the inner cores of the adjacent panels and have their bail portions fastened with fastener elements along a centerline of the joint. The panels can be installed to form hair line joints by undercutting an overhanging front face on one panel, or to form outside or inside corners by cutting into a rear surface and bending the front surface of the panel to form the corner.

16 Claims, 7 Drawing Sheets

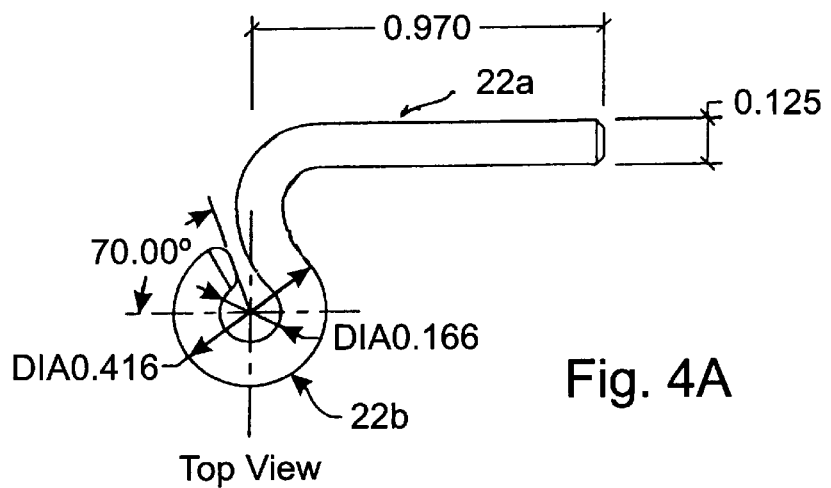
Fig. 4A
Top View
Fig. 4B
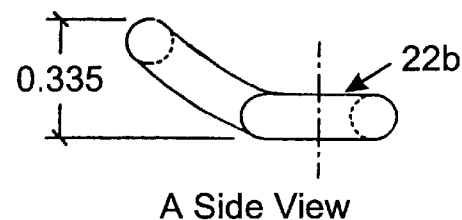
A Side View
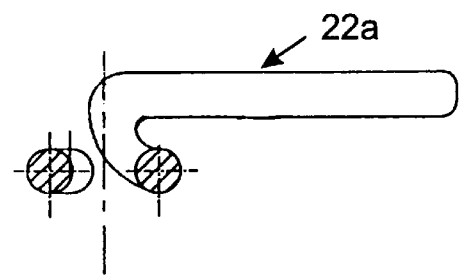
Fig. 4C
Front Section

WIRE CLIP MOUNTING SYSTEM FOR STRUCTURAL PANELS

FIELD OF THE INVENTION

This invention generally relates to a device and method for mounting a structural panel to a wall, and particularly to a wire clip mounting system which is convenient and inexpensive to install.

BACKGROUND ART

Architectural structural panels are attached to building walls of all types to cover inner wall structures and beautify or augment the external or interior appearance of building walls. The manner of attachment of the panels to walls can be expensive, and in some cases the attachment can be more expensive than the panels themselves. In the current commercial building market, building designers prefer panel installations that show no fasteners, but rather show crisp, clean joint lines. Installers must be able to size the panels readily and form joints that are properly located and cleanly formed.

An ideal structural panel is lightweight and relatively inexpensive to manufacture, has good insulation value, and resistant to wear. Panels that are durable, weather-resistant, and have high compressive and shear strength are particularly useful for outdoor applications. Structural panels having metal face sheets laminated with a plywood or wood composite core have been used, but are known to have the problem of being vulnerable to damage from moisture which can seep into the wood core. Honeycomb cores of plastic or metal material laminated between metal face sheets are strong and water-resistant, but have high fabrication costs. Structural panels with metal face sheets laminated to a core of foam or solid polyethylene provide a combination of advantages. For example, a laminate may be formed using the improved sheet bonding process developed by the present inventor, as described in U.S. Pat. No. 5,114,510 for "Method of Forming a Lightweight Structural Panel", issued on May 19, 1992.

A further improved structural panel having metal face sheets bonded to a plastic core body formed by two outer liner sheets fusion-bonded to an inner corrugated plastic sheet was also developed by the present inventor, as described in U.S. Provisional application Ser. No. 60/051178, filed on Jun. 28, 1997, and formal U.S. patent application Ser. No. 08/958,340, filed on Oct. 27, 1997, entitled "Structural Panels With Metal Faces and Corrugated Plastic Core", which are incorporated herein by reference. These corrugated-core panels have excellent strength-to-weight properties and resistance to weathering.

Current panel installation systems in widespread use require panels to be cut to size, and the panel edges to be fabricated or bent and fastened in metal extrusion channels or rails which are mounted along the boundaries of the panels. It is often difficult to securely hold a panel in place without shifting or buckling relative to adjacent panels, thereby degrading the clean appearance of the joints. Also, panels having plastic core materials as are commonly used today do not have suitable landing areas that allow caulk to adhere cleanly to the panel edges at a joint.

It is therefore a principal object of the present invention to provide for mounting a structural panel to a wall in a manner that is efficient and inexpensive, and that will hold a panel securely in place so that it does not shift or buckle relative to adjacent panels or degrade the clean appearance of the joints.

It is a specific object to provide for mounting a preferred type of structural panels having corrugated plastic cores, and also to implement the mounting in a manner which allows caulk to adhere cleanly to THE panel edges at the joints. A further object is to provide a mounting device and method which is easy to use for panel installation, and which is completely hidden from view of the front side of the panel. Yet another object is to provide a mounting device and method for forming hair line joints which is easy to use and which allows the panels to move with respect to each other for normal expansion and contraction of the wall.

SUMMARY OF THE INVENTION

In accordance with the present invention, a device for mounting a structural panel, of the type having durable outer surfaces and a penetrable inner core of a given thickness, to a wall comprises a wire clip having a bail portion formed in an annular shape for insertion of a wall fastener element therethrough into an anchor member of the wall, and an arm portion extending from the bail portion having a linear shape for insertion into the thickness of the inner core of the panel at an exposed lateral edge thereof, wherein said bail portion is offset from said arm portion both in a lateral direction and in a thickness direction of the panel for positioning said bail portion for fastening to the anchor member of the wall when said arm portion is inserted into the thickness of the inner core of the panel.

The invention also includes a related method for mounting a structural panel to a wall using the wire clip device. In the preferred method, the panel is of the type having outer metal face sheets adhesively bonded to an inner plastic core body formed as a unitary member having outer plastic liner sheets fusion-bonded to ridges of an inner plastic corrugated core sheet, wherein said corrugated core sheet has undulating corrugations forming spaced-apart truss elements with open spaces therebetween into which the arm portion of the wire clip device may be inserted. The offset shape of the wire clip positions the bail portion and fastener element behind the plane of the rear surface of the panel.

For mounting adjacent panels at a joint, respective sets of wire clip devices have their arm portions inserted laterally into the inner cores of the adjacent panels and have their bail portions with fastener elements aligned along a centerline of the joint. A hair line joint may be formed by undercutting the inner core and rear surface to form an overhanging front surface for one panel, and installing it with the wire clips to slide over the front face of the other panel. The panels can be installed to form outside or inside corners by cutting into the rear surface and bending the front surface of the panel to form the corner. Backer rods or foam tape may be inserted in the joints to make caulking over them easier and to save the sealant required to fill the joints.

Other objects, features and advantages of the present invention are described in detail below in conjunction with the drawings, as follows:

BRIEF DESCRIPTION OF THE DRAWINGS

FIG. 4A is a plan view showing a wire clip device in accordance with the invention, FIG. 4B is a side view of the wire clip device, and FIG. 4C is a front section view of the wire clip device.

DETAILED DESCRIPTION OF THE INVENTION

For the construction industry, the ideal structural panel is lightweight and relatively inexpensive to manufacture, has good insulation value, and is resistant to wear. Panels that are durable, weather-resistant, and have high compressive and shear strength are particularly useful for outdoor applications. Structural panels having metal face sheets laminated with a plywood or wood composite core have been used previously, but have the problem of being vulnerable to damage from moisture which can seep into the core. The moisture can cause the plywood or composite core to swell or rot. One therefore avoids the use of panels with plywood or wood composite cores for outdoor applications.

Structural panels having metal face sheets laminated to a core of foam or a solid polyethylene have good properties for outdoor use. While metal-faced panels with foam cores have been used successfully, they have insufficient shear strength for some high-load applications. Also, moisture collected in the foam core that is subjected to cycles of freezing and thawing can damage the panels by causing the layers to delaminate. On the other hand, use of a solid plastic core sheet is costly and wastes material in excess of what is necessary to provide adequate compressive and shear strength. Panels having plastic or metal honeycomb cores have relatively high fabrication costs. The honeycomb cells are also closed off by the face sheets, thereby forming trapped air or moisture pockets which can generate expansion pressures from heat or freezing water that can delaminate the face sheets from the cores.

An improved structural panel having metal face sheets bonded to a plastic corrugated core was developed by the present inventor, as described in U.S. patent application Ser. No. 08/958,340, filed on Oct. 27, 1997, entitled "Structural Panels With Metal Faces and Corrugated Plastic Core", incorporated herein by reference. These corrugated-core panels have excellent strength-to-weight properties and resistance to weathering, and are therefore a preferred type of structural panel for use in the present invention. In the following detailed description, a device and a system are described for mounting the preferred corrugated-core panels to a wall. However, it is understood that the principles of the invention may be applied equally to other types of structural panels having similar physical characteristics.

Figure 1:
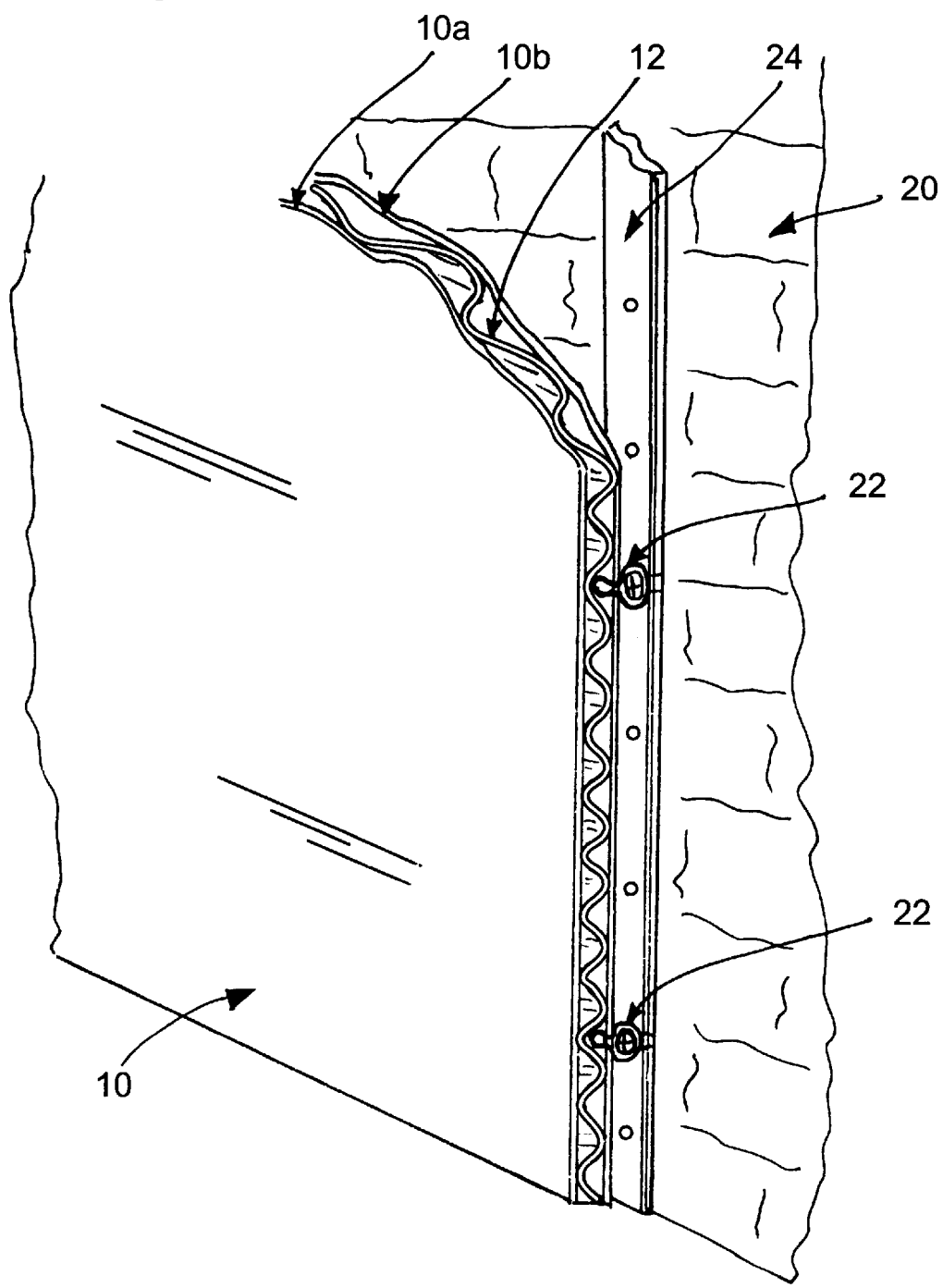
FIG. 1 is a diagram in section in perspective view showing the mounting of a structural panel of a preferred type to a wall using wire clip devices in accordance with the present invention.

Referring to FIG. 1, a structural panel 10 of the corrugated-core type is shown mounted over a wall 20 using mounting devices 22 which attach the panel 10 to wall anchor members 24 fastened to the wall 20. The wall may be an exterior wall, for example, made of brick, hollow tile, concrete, beams, etc., or may be an interior wall formed by wood, plaster, hollow tile, studs, or other wall-defining structures. The wall anchor member is typically wood sheathing, furring strips, or studs fastened at intervals to the underlying wall structure. The structural panel 10 is mounted over the wall 20 to provide a durable, wear or weather-proof surface, and give it a finished appearance. Wall insulation, such as thermal padding, foam, or other insulation materials may be placed between the underlying wall 20 and the panel 10.

The corrugated-core type panel 10 has one or two-sided, metal or metallized outer face sheet(s) 10a, 10b bonded to an inner plastic core body 12. The core body is formed as a unitary member having outer plastic liner sheets fusion-bonded to ridges of an inner corrugated plastic core sheet. The undulating corrugations of the core sheet form spaced-apart truss elements with open spaces therebetween extending in a plane direction of the core body. The corrugated plastic core body may be formed by a continuous extrusion process as disclosed in U.S. Pat. Nos. 3,837,973 and 3,999,928 to Asakura et al. The resulting core body is durable, flexible, and has strong liner-to-core-sheet bonds formed by the fusion bonding. Polyethylene is the preferred plastic material for the core body, as it is found to have superior characteristics when bonded to metal face sheets. The corrugated polyethylene core body can be obtained commercially under the tradename Corrugated PolyAllomer (CPA) ™, sold by U.S. Corrulite.

The metal face sheets 10a, 10b may be bonded to the corrugated plastic core body using an advantageous metal-to-plastic sheet bonding process developed by the present inventor, as described in U.S. Pat. No. 5,114,510, entitled "Method of Forming a Lightweight Structural Panel", incorporated herein by reference. The face sheets may be made of aluminum sheet, other metallized sheet, or a metallized layer formed on a suitable substrate. However, fiberglass or structurally hard plastic (ABS) sheets may also be used in certain cases. In the bonding process, the corrugated core body has an adhesive layer misted or sprayed on an outer plastic liner sheet. At the same time, a metal face sheet has a lower surface exposed to an electron plasma surface treatment and mated with the adhesive layer on the liner sheet of the core body. The process is repeated on the other side of the core body if two metal face sheets are used.

The electron plasma treatment oxidizes oil, rust spots, or films on the surface of the metal sheet so that the metal surface accepts the adhesive better. The electron plasma treatment also renders the metal sheet more malleable, i.e. bendable or ductile, so that it does not crack when worked or shaped into laminate forms. The adhesive material is preferably a reactive polyester epoxy or polyurethane (or any of a number of types of latexes) for greater adhesion to the free radical elements of the treated surfaces. Since epoxy tends to be brittle, a polyurethane adhesive or a modified epoxy (TS) with greater elasticity can be used if the laminate is to be bent or worked.

The resulting structural panel has superior bonding characteristics which reduce the risk of delamination. The plastic core body also provides sound deadening or vibration damping, and the metal face sheets provide grounding protection. The panel is durable and lightweight, and obtains maximum strength and utility for a minimum of material used. It has good rigidity, high tensile strength, high compressive and shear strength, and is resistant to swelling from moisture, weathering, and freezing and thawing cycles. The corrugated plastic core treated as described above has the advantage that caulk will stick to the edges of the panels, both mechanically and chemically. The panel can also be fabricated easily and at a relatively low cost. A double-sided metal-faced panel can be manufactured in thicknesses from 0.125 inch to 0.50 inch, and is especially suitable for use as storefront panels, opaque glazing, curtain walls, in-fill panels, soffits, canopies, signboard, and many other construction applications. Such metal-faced, corrugated-core panels can be obtained commercially under the tradename Omega-Lite™, sold by Laminators, Inc., located in Hatfield, Pa.

Figure 2A:
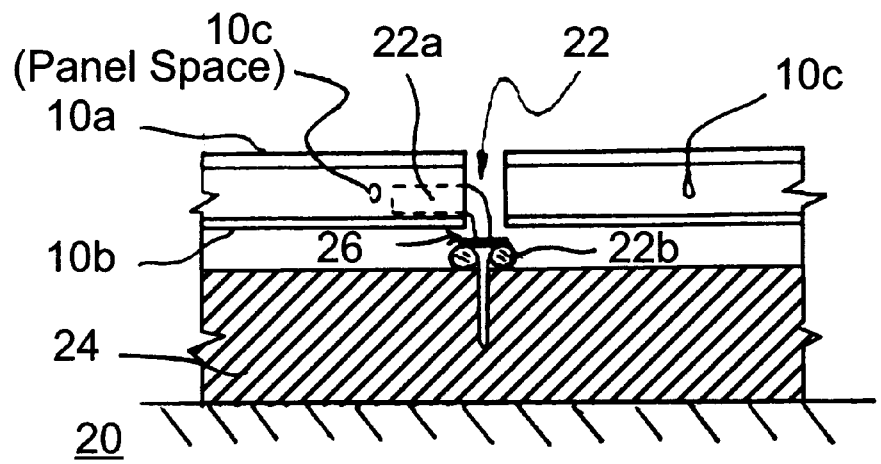
FIG. 2A is a sectional view showing the wire clip device for mounting the structural panel to the wall.

Referring to FIG. 2A, the method of mounting a structural panel to a wall with the wire clip devices is illustrated. For a panel 10 of the preferred type having a corrugated core body, the wire clip device 22 has an arm portion 22a that inserts laterally into the thickness of the exposed edge between the front and rear surfaces 10a, 10b of the panel. The inner end of the arm portion 22a fits with a tight fit into the spaces 10c between corrugations of the core body. The arm portion 22a may also be formed with a sharp point and punched transversely through the plastic walls of the core body.

Extending from the arm portion 22a, the wire clip device has a bail portion 22b that is bent to form an annular anchor member 24 that is dimensioned to accept a fastening screw 26 or nail which is threaded or punched into the wall anchor member 24 to fasten the clips at intervals along the wall 20. The arm and bail portions 22a, 22b are bent with an offset shape that allows the wire clip to hold the panel at a desired spacing from the building wall. The offset shape also allows the bail portion and fastener head to be positioned behind the plane of the rear surface 10b of the panel, so that adjacent panels can be brought close together or with outer skins overlapped to form a clean joint. With the bail portions and fastener heads positioned out of the way, the centerline of the joint between adjacent panels can be aligned with the fastener head positions. The shape and dimensions of the wire clip device 22 allow it to be conveniently inserted between or through the walls of the corrugations of the panel and readily fastened in position to the wall anchor member without the problem of misalignment or risk of deforming the panel's metal edges.

Figure 2B:
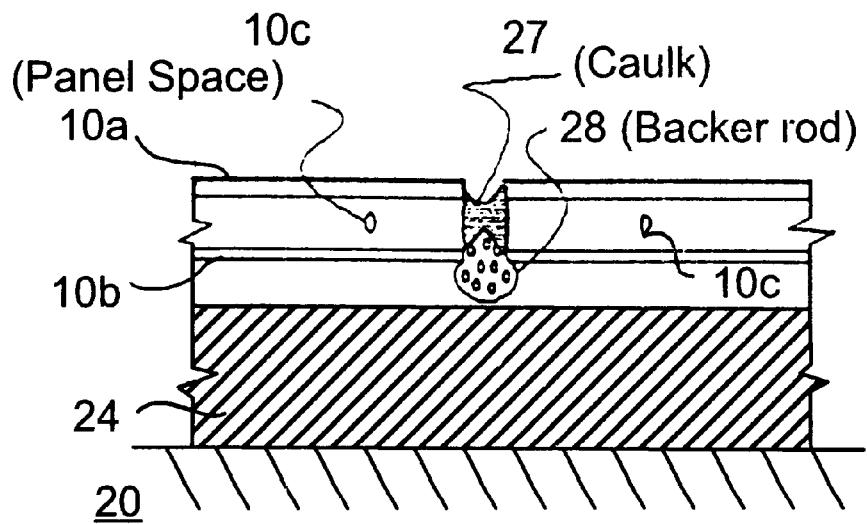
FIG. 2B shows the mode of caulking the joint between installed panels.

In FIG. 2B, the method of caulking the joint between adjacent panels is shown. In the intervals between fastener positions, a segment 28 of backer rod is pressed into the space between the edges of the adjacent panels and against the wall anchor member 24 as fill material for caulking. Caulk is then laid into the space between the panels edges against the backer rod. Due to the corrugations of the core body and the surface treatment of the plastic material as described above, the caulk sticks well to the exposed edges of the panels to form a clean, filled joint.

Figure 3A:
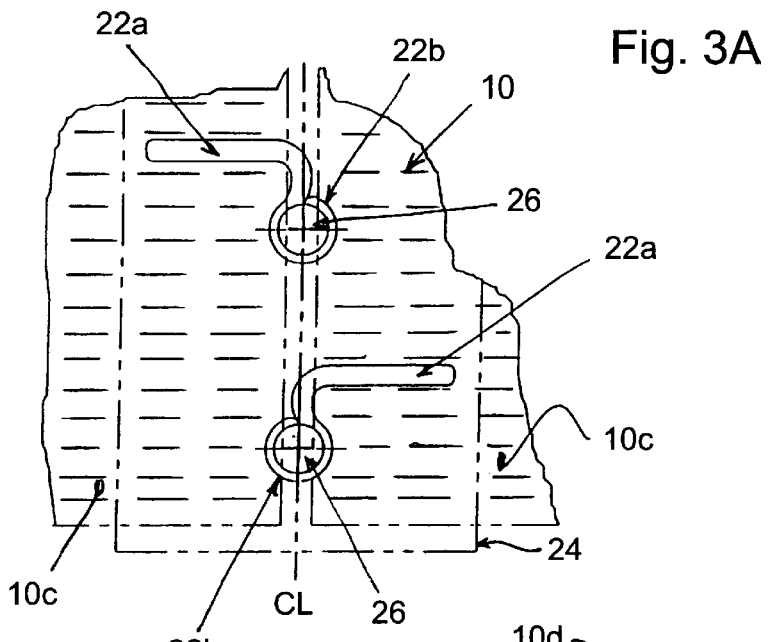
FIG. 3A is a plan view showing the wire clip device for mounting the structural panel to the wall.

FIG. 3A shows a plan view of the mounting of adjacent panels with wire clips to form a joint. Respective sets of wire clips 22 have their arm portions 22a inserted laterally into the corrugation spaces in the core bodies of the adjacent panels and have their bail portions 22b and respective fasteners 26 aligned along a centerline CL of the joint. Backer rods or foam tape may be inserted in the joints to make caulking over them easier and to save the amount of sealant required to fill the joints.

Figure 3B:
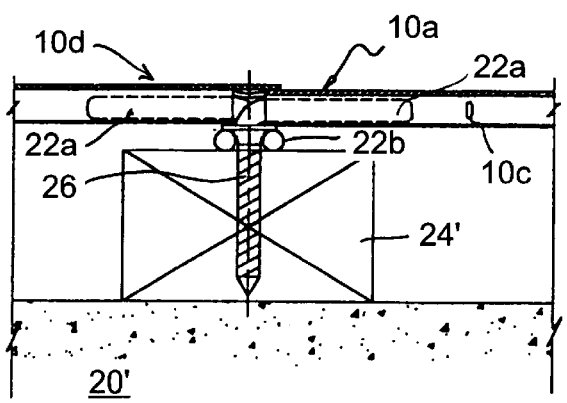
FIG. 3B shows mounted panels overlapped to form a flush surfaced joint.

FIG. 3B illustrates forming a flush-surfaced joint by undercutting the core and rear surface of a panel (left side panel in the drawing) in the lateral direction from under the edge of its front surface 10a. When the adjacent panel (right side panel in the drawing) is mounted in position with wire clips on its side, the undercut panel is mounted by sliding it onto the projecting arm portions 22a of wire clips fastened on its side until the rear surface edge and core of the undercut panel are seated against the bail portion and fasteners and the front surface 10a of the undercut panel is overlapped on the front surface of the adjacent panel. The figure shows the underlying wall 20 as made of concrete or cinder block with studs 24' erected thereon.

Figure 3C:
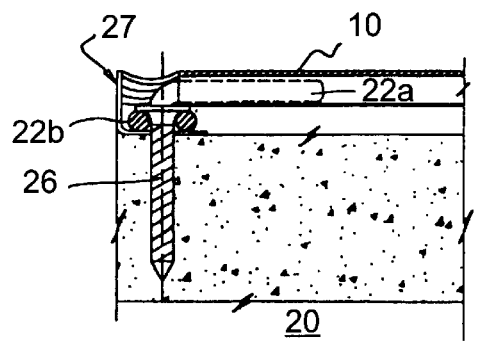
FIG. 3C shows a panel caulked to a brake formed angle at the end of a panel run.

FIG. 3C illustrates the finishing of an end of a panel run by fastening a brake formed angle 27 to the wall (or wall anchor member) with the bail portions of the wire clips and fastener screws. Backer rods may be inserted in the spaces between wire clips and fastener screws and the joint can be caulked as described above with respect to FIG. 2B.

FIGS. 4A, 4B, and 4C show top, side, and front section views of an example of a wire clip device of the present invention. For the preferred panel type with plastic corrugated core bodies having a thickness of 0.250 inch (from outer metal face to metal face), the wire clip has an outer diameter of 0.125 inch sufficient for an interference fit into the walls of the preferred corrugated plastic (CPA) core body. Thinner or thicker wire may be used as appropriate for other types and sizes of panels. The arm portion shown in FIG. 4A has a total length of 0.970 inch. The end of the arm portion may be chamfered for easy insertion into the corrugated spaces, or it may be sharpened to act as a penetrating end like a nail or auger to be pushed perpendicularly through the plastic walls of the CPA core body. It may also be pushed into the core thickness of a solid core such as wood, polyethylene sheet, or foam core used in other types of panels.

For typical wallboard screws, the annular bail portion has an inner diameter of 0.166 inch and outer diameter of 0.416 inch, and terminates in a hook end at an outside angle of 70° to the lateral direction (parallel to the arm portion). The arm portion is offset in the panel thickness direction (normal to the plane of the bail portion) by an outside distance of 0.335 inch. The clip is preferably formed of plastic coated, galvanized steel wire. It may also be formed from plastic, other wire stocks, other types of metal, or with other coatings or variations from the example shown. It could also be formed with double arm portions or punched from sheet metal with multiple prongs.

A procedure for installing the preferred type of corrugated-core panels with the above-described wire clips on exterior cinder block walls of a house will now be described. First, the wall space to be covered is measured for the locations of the joints for panels of the given stock size and for the desired visual appearance. The edges of the panels are positioned where long straight cuts would normally fall, such as next to windows and doors. Outside corners can be used to make up the ends of the panel runs. Chalk lines are put up to mark the vertical lines of the joints, and furring or studs are attached to the walls as panel anchor structures at the joint lines. Metal extrusion forms are laid out at the bottoms of the walls to define the bottom edges of the panels.

Insulation can be installed over the walls or between studs. in the case of furring over cinder block, 0.75 inch thick foam insulation may be used. The foam layers may be bonded to the panels and also to the furring strips with panel cement. Dobs of cement are applied to the inner surfaces of the panels, and the panels can be rested on the bottom edge extrusions while the panel cement dries. The panels are then raised to their final positions against the insulation layer and mounted in place by inserting the arm portions of the wire clips into the exposed edges of the panels and fastening the bail portions of the wire clips with 1 inch thick dry-wall, bugle-head screws to the furring or studs. 16" to 24" on-center spacing of wire clips is usually adequate for installing panels in conjunction with panel adhesive.

The undulating walls of the corrugated cores allow the wire clips to be positioned at practically any position along the edge, and they can be moved easily at any time if they are inserted in the wrong spot. A screw gun is all that is needed to drive the fasteners into the wall to mount the panels. The clips fastened into one panel holds it in place while an adjacent panel is mounted adjacent to it. Drywall screws can be driven in to desired depths to align the plane surfaces of adjacent panels evenly. After the panels are installed, adjustments may be made by placing a board against the edge of the panel and tapping with a hammer to nudge the clips slightly for precise alignment of the joints. Hairline joints may be formed by tapping the installed panel close to the adjacent one by the clips being nudged into the edge of the rear metal surface of the panel.

The joints between adjacent panels can then be caulked and tooled to finish the installation. Common types of caulk materials or silicone or rubber sealants may be used. If the panels are supplied with clear plastic masking to protect their surfaces from stains and scratches during transit and storage, the masking on the front surfaces may be left in place during panel installation and removed after caulking to take off the excess caulk and leave behind clean and straight caulk lines.

Due to mounting with wire clips, metal extrusion forms are not required along the lateral edges of the panels, thereby saving up to 50% of the installation material cost in some cases. A wide variety of extrusion forms may be used to finish off the top and end-run edges of the installed panels. Outside and inside corners can be handled in a variety of ways, including caulking the joints between two end panels, or cutting and bending the panels to form corners. The corrugated-core metal-faced panels described above can be easily cut and fabricated during installation with carpenters tools.

Figure 5:
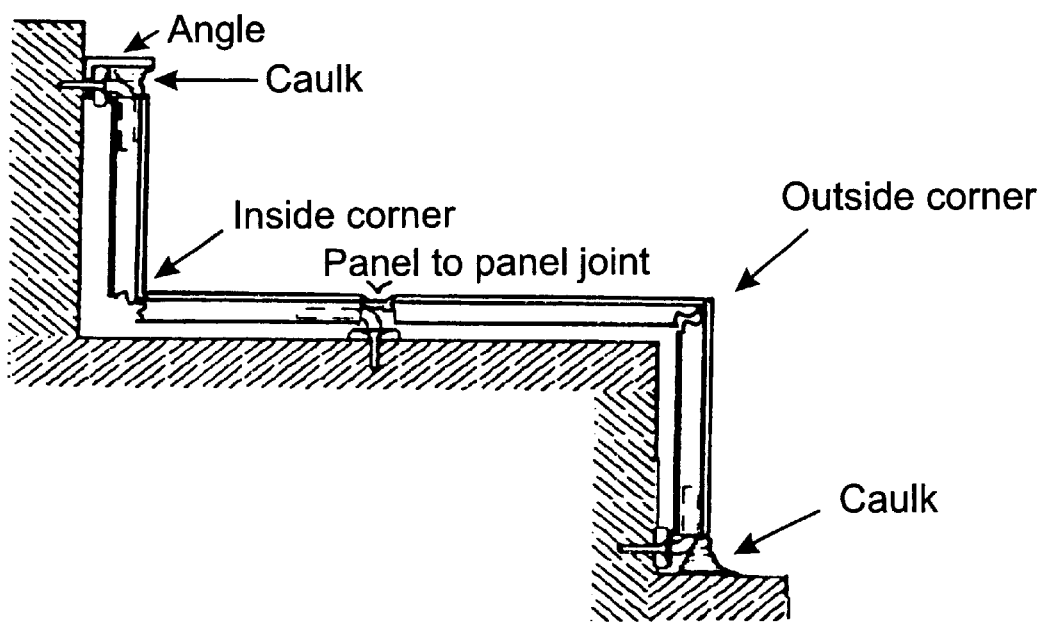
FIG. 5 is a schematic diagram illustrating the mounting of panels with wire clip devices to form panel-to-panel joints, corners, and panel ends.

As indicated in FIG. 5, outside corners can be formed by cutting a V-groove in the rear metal surface of the panel with a router, then bending the panel at the front metal surface to form the corner. Inside corners can be made with just a saw kerf in the rear surface of the panel and bending the panel ends away from the cut. Ends of panel runs can be finished by caulking the joint with an abutting wall, or by installing an angle-forming brake and caulking the panel edge with the brake. The panels may also be installed around pipes, windows, and other protrusions by cutting out the necessary shape and caulking over the clearance space. Flashing or other trim can be applied to the panels to direct water away from the cavity behind the panels.

Referring to FIGS. 6A to 6F, a procedure will now be described for preparing and mounting two adjacent panels with the wire clip devices of the present invention to form a hair line joint that gives a clean, finished appearance to an installation of the panels. In this example, the preferred panels are of the above-described type having outer metal skins sandwiched over a corrugated CPA core body and a thickness of 0.250 inch.

The wall should have wood sheathing as the wall anchor members, or should have wood or metal furring behind the joint to accept the drywall screws used to fasten the wire clips into place. If gypsum sheathing is used, it should be furred over with wood, because the gypsum will not hold the screws adequately. The joints are located and chalked on the building wall. Joint tape 1.5 inch wide is applied to the wall centered over the chalk lines to act as a bond breaker for the sealant joints. The foam tape allows the back side of the caulk to stretch without hindrance, and assists in the tooling of the sealant. A tape thickness of about 0.1875 inch would put no backside pressure on the panels. The tape also allows adjustment of the panels for plumb and true after they are fastened in place by the clips and screws.

Figure 6A:
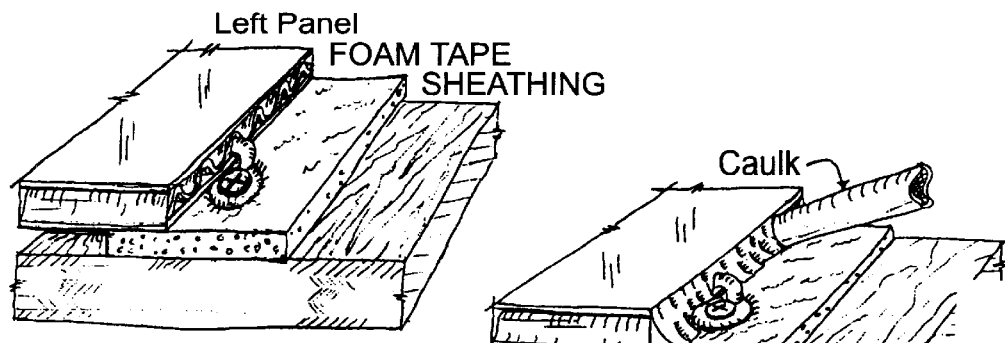
FIGS. 6A to 6F are schematic diagrams illustrating a method for forming a hair-line joint between panels using the wire clip devices of the present invention.
Figure 6B:
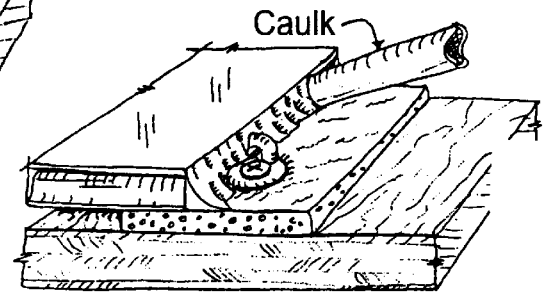

In FIG. 6A, a left side panel is cut to size and mounted with wire clips and drywall screws to one side of the joint. The clips are spaced at about 2-foot intervals on centers and fastened to the sheathing through the centerline of the joint tape. Care should be taken not to overdrive the screws because they can deform. If they are put in just-snug, they may be adjusted for plumb later if needed. In FIG. 6B, caulking is applied to the exposed edge of the left panel core.

Figure 6C:
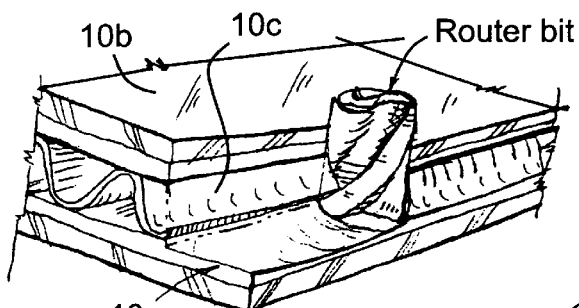

In FIG. 6C, a right side panel is prepared by undercutting the rear metal face 10b and core 10c away by a desired amount. For example, a 0.50 inch router bit can be used to cut to a depth sufficient to cut the skin off the plastic layer bonded to the opposite (front) metal face, leaving a cut layer of plastic bonded to the metal face. The layer of plastic (exposed polyolefin) will act as a bond breaker which the caulk will not stick to. To allow the panels to be moved if need be, the sealant should not stick to the back of the front face, but only to the core edges of the panels on either side of the joint. The router is cut into the right side panel to give a 0.375 inch wide caulk joint, and a 0.125 inch thick, overhanging front face to overlap and cover the joint at the front face of the left side panel.

Next, panel adhesive is applied to the wall in stripes 2 feet on center and allowed to tackify with the panels pressed against the adhesive as described previously. The adhesive does several things for the panel. It anchors the panel against wind pull-off, and also holds the panel against shear forces from the weight of the panel. It keeps the panel attached to the building so that if the wall shifts, the panel moves with it. This reduces the movement in the joints and reduces the stress on the sealant.

Figure 6D:
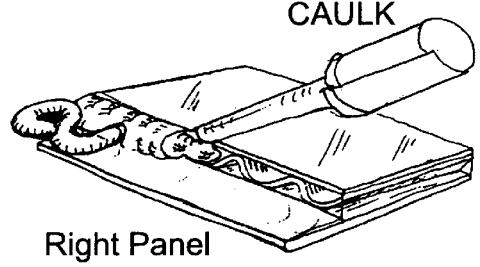
Figure 6E:
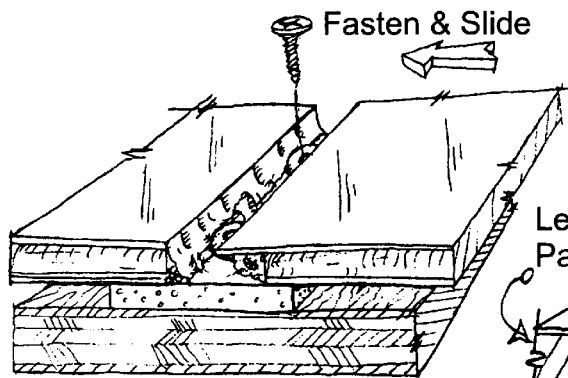

In FIG. 6D, the right panel is shown being prepared by inserting the arm portions of the wire clips into the core corrugations at desired positions along the edge, and applying caulk to the inside corner of the cut-away core edge and front face. The clips should extend from the core corrugations so as to overhang the rabbitted cut-out area in the panel so that the screws can be sunk into the annular members when the right panel is to be positioned in place on the wall, as shown in FIG. 6E. With the clips of the right panel fastened to the centerline of the joint, adjustments for plumb and true of the two panels can be made, then the right panel is slid on the clip arm portions until the front face of the right panel overlaps onto the metal face of the left panel to form a hair line joint. The opposite edge of the right panel can then be secured by clips and screws to fix it in place for forming the next joint.

Figure 6F:
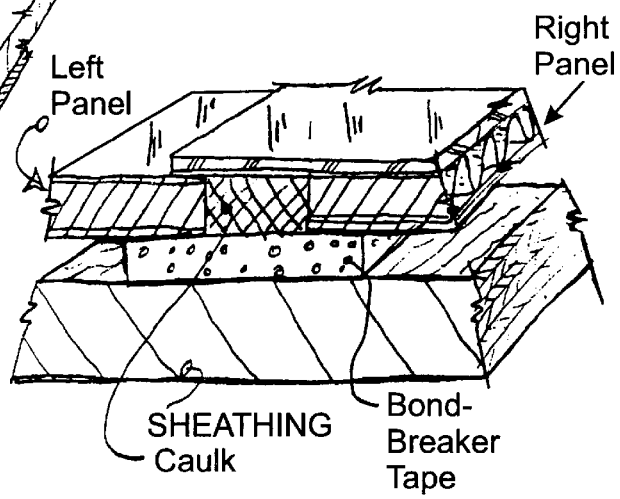

The completed hair line joint is illustrated in FIG. 6F. The overlapped front face covers the joint from the weather and keeps moisture out of the joint. The sealant covers only the edges of the panels and is not sealed to the back side of the front face. The joint tape allows the sealant to stretch and cure, and also prevents sealing to the back faces of the panels. With two-side sealing, the panels may be moved apart on the clips for adjustment or removal. The panels and joint can move with the building wall to allow normal contraction and expansion movements. The field installation procedure is easy to perform and obtains aesthetic and weather-proof hair line joints. Touch up paint may be applied to the exposed edge of the overlapping metal face to hide it further.

Figure 7A:
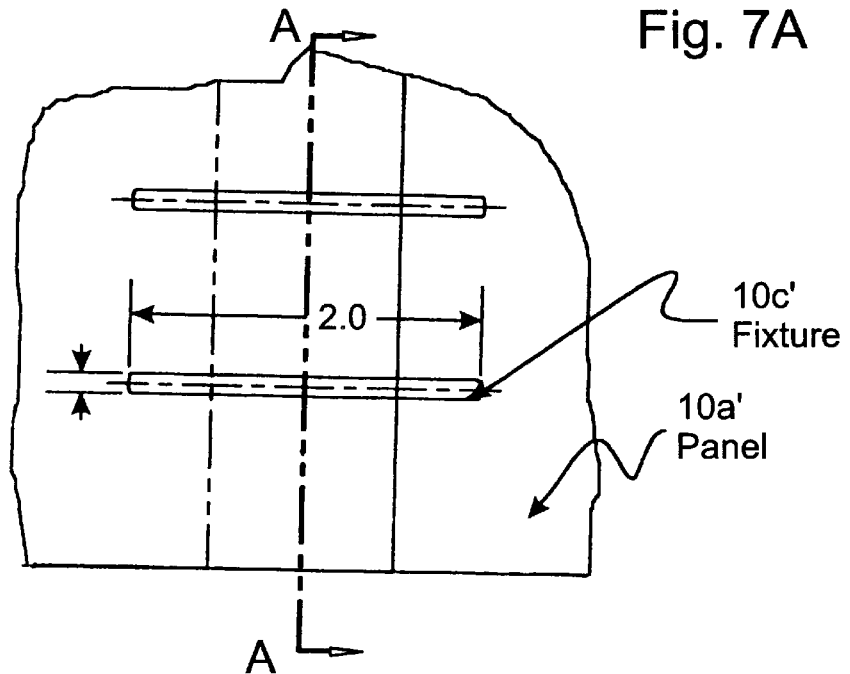
FIG. 7A is a plan view and FIG. 7B is a side view taken along line A—A illustrating another method for forming a hair-line joint between panels using modified wire clip fixtures.
Figure 7B:
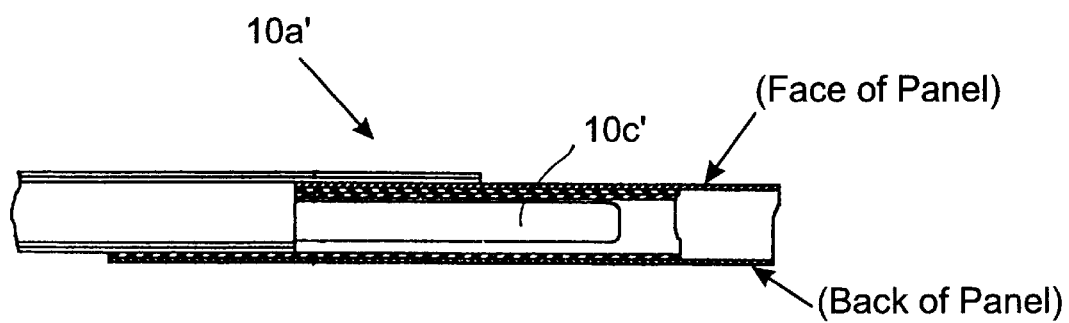

In FIGS. 7A and 7B, another method of forming a hair line joint is illustrated using modified wire clip fixtures. As described above, one panel (the left side in the figures) has its inner core and rear face undercut to form an overhanging front face 10a'. The other panel may simply be cut to size, or similarly undercut to form an overhanging rear face 10b'. One panel is mounted in position by its opposite edge (not shown) with wire clip fasteners of the type previously described. Then straight alignment clips or pins 22' are inserted into the core edge of the one panel, with a portion left exposed to mount the other panel. Sealant may be applied to the edges of the panel cores. The other panel is then aligned with the first one and slid onto the pins 22' until it abuts against the first panel with its front face overlapped on the other panel to cover the joint. The second panel may then be secured in position by wire clip fasteners applied to its opposite edge (not shown). For interior mountings where weather-proof joints are not required, both panels may simply be cut to size and installed flush together at the joint.

The wire clip device and mounting system of the present invention can dramatically reduce the time and cost for panel installation. The offset dimensions of the wire clips allow the panels to float on the building without rigid connection to the building, and allow space for venting and/or insulation. They can accommodate installation over any type of building surface, insulation, sheathing, studs, etc. During installation they can be adjusted in position to accommodate out-of-square or out-of-plane panels, varying surfaces of wall substrates, and for close joint spacings that provide an attractive look in today's construction market. The same clips may be used for horizontal or vertical installation of panels. The clips are hidden behind the panel joints and are protected from weathering by the caulking. They are also easily removable for panel repair or removal. The wire clips are especially useful for installing corrugated-core type panels currently popular with panel manufacturers. The installation system can also be used for veneer and insulated panels.

The wire clip fastening system provides wind load resistance superior to other mounting systems at a lower installation cost. It works with raw-edge panels, thus reducing or eliminating shop fabrication and making job-site fabrication faster. Only the one type of wire clip and shape of angle are needed to meet all installation conditions, thereby reducing the amount of inventory needed to support the system. Due to their adjustability, they can also be used for fastening unusual cut outs and curved edges as well as for mounting curved panels without any special formed extrusions.

The wire clip fasteners and mounting methods of the invention leave no evidence on the face of the panel that they are there. The wire clips insert sidewards into the inner core of the panel and are offset toward the back panel and fastened along the joint centerline, thereby ensuring that no dents or other damage occur on the front face. In contrast, conventional mounting systems use expensive and labor intensive channel extrusions, brackets, angles, and clips that are visible from the front or can cause damage to the front surface by pressure from the rear causing outdents.

Although the invention has been described with reference to certain preferred embodiments, it will be appreciated that variations and modifications thereof may be devised in accordance with the principles disclosed herein. The invention, including the described embodiments and variations and modifications thereof, is defined in the following claims.

I claim:

1. A wire clip device for use in mounting a structural panel to a wall, the structural panel being of the type having durable outer surfaces and a penetrable inner core of a given thickness formed with a corrugated plastic core having undulating corrugations forming spaced-apart truss elements with open spaces therebetween, said wire clip device comprising:

a wire clip having a bail portion formed in an annular shape for insertion of a wall fastener element therethrough into an anchor member of the wall, and an arm portion extending from the bail portion having a linear shape for insertion into the thickness of the inner core of the panel at an exposed lateral edge thereof, wherein said wire clip is shaped with said bail portion offset from said arm portion both in a lateral direction and in a thickness direction of the panel such that said bail portion is positioned for fastening with said wall fastener element to the anchor member of the wall when said arm portion is inserted into the thickness of the inner core of the panel, wherein a distal end of said arm portion is chiseled with a sharp point so that the wire clip can be punched sidewards into the corrugated material of the inner core of the panel.

2. The wire clip device according to claim 1, which is formed of plastic coated, galvanized steel wire.

3. The wire clip device according to claim 1, which is formed from metal wire bent to form said arm portion and said offset bail portion.

4. A device in combination with a structural panel of the type having durable outer surfaces and a penetrable inner core of a given thickness, the device comprising:

a wire clip having a bail portion formed in an annular shape for insertion of a wall fastener element therethrough into an anchor member of a wall, and an arm portion extending from the bail portion having a linear shape and an end dimensioned and shaped so as to allow it to be press-fitted by insertion into the thickness of the inner core along an exposed lateral edge of the panel and to hold the panel by its inner core only at the exposed lateral edge thereof, wherein said wire clip is shaped with said bail portion offset from said arm portion both in a lateral direction and in a thickness direction of the panel such that said bail portion is positioned for fastening with said wall fastener element to the anchor member of the wall when said arm portion is inserted into the thickness of the inner core of the panel, and wherein said wire clip is formed with a plurality of arm portions that are inserted into the panel core at a plurality of positions for each wire clip mounting.

5. A method for mounting a structural panel, of the type having durable outer surfaces and a penetrable inner core of a given thickness, to a wall comprising the steps of:

providing a wire clip having a bail portion formed in an annular shape for insertion of a wall fastener element therethrough into an anchor member of the wall, and an arm portion extending from the bail portion having a linear shape and an end dimensioned and shaped so as to allow it to be press-fitted by insertion into the thickness of the inner core of the panel only at an exposed lateral edge thereof, wherein said wire clip is shaped with said bail portion offset from said arm portion both in a lateral direction and in a thickness direction of the panel; and mounting a panel to the wall by inserting the arm portion of the wire clip into the thickness of the inner core of the panel, and positioning and fastening the bail portion of the wire clip with the wall fastening element to the anchor member of the wall, wherein the panel is of the type having outer face sheets adhesively bonded to an inner plastic corrugated core having undulating corrugations forming spaced-apart truss elements with open spaces therebetween into which the arm portion of the wire clip is inserted.

6. A method for mounting a structural panel according to claim 4, comprising the further steps of mounting a first panel with the first-mentioned wire clip inserted in the lateral edge on one side of the first panel, then mounting an adjacent panel with a lateral edge thereof flush with a lateral edge of the first panel on an opposite side from said one side, using a straight pin device formed as a linear piece having opposing ends for insertion, respectively, into the inner cores of the adjacent panels to hold them together.

7. A method according to claim 5, used for mounting adjacent panels at a joint, wherein respective sets of wire clips have their arm portions inserted laterally into the inner cores of the adjacent panels and have their bail portions fastened with fastener elements along a centerline of the joint.

8. A method according to claim 7, further comprising the step of finishing the joint by inserting backer rods or foam tape in the joint and caulking over them with sealant.

9. A method according to claim 7, further comprising the step of adjusting the fastening elements for depth of fastening into the wall anchor member so as to align the plane surfaces of the adjacent panels.

10. A method according to claim 7, further comprising the step of adjusting the alignment of a panel at the joint by nudging the panel from its opposite edge into alignment with the adjacent panel.

11. A method according to claim 5, further comprising the step of supplying the panels with clear plastic masking on at least their front surfaces for protection during transit and storage, leaving the masking on the front surfaces in place during installation of the panels at a joint, then removing them after caulking the joint to take off the excess caulk and leave behind a clean and straight caulk line.

12. A method according to claim 5, further comprising the step of mounting a panel to form an outside or an inside corner by cutting into a rear surface of the panel and bending the front surface of the panel to form the corner.

13. A method according to claim 5, further comprising the step of installing a panel around pipes, windows, or other protrusions by cutting out the necessary shape from the panel, mounting the panel to the wall using the wire clips, and caulking any space between the panel and the protrusion.

14. A method for mounting a structural panel, of the type having durable outer surfaces and a penetrable inner core of a given thickness, to a wall comprising the steps of:

providing a wire clip having a bail portion formed in an annular shape for insertion of a wall fastener element therethrough into an anchor member of the wall, and an arm portion extending from the bail portion having a linear shape and an end dimensioned and shaped so as to allow it to be press-fitted by insertion into the thickness of the inner core of the panel only at an exposed lateral edge thereof, wherein said wire clip is shaped with said bail portion offset from said arm portion both in a lateral direction and in a thickness direction of the panel; and mounting a panel to the wall by inserting the arm portion of the wire clip into the thickness of the inner core of the panel, and positioning and fastening the bail portion of the wire clip with the wall fastening element to the anchor member of the wall, said method being used for forming a hairline joint between adjacent panels, further comprising the steps of mounting one panel with wire clips to the wall anchor member to one side of the joint, undercutting the inner core and rear surface of the other panel to form an overhanging front face, and mounting the undercut other panel with wire clips by sliding it on the arm portions of the wire clips until the overhanging front face overlaps the front surface of said one panel to form the hair line joint.

15. A method according to claim 14, further comprising the step of installing joint tape on a centerline of the joint, and fastening the wire clips mounting the panels to the wall anchor member over the joint tape.

16. A method for mounting a structural panel, of the type having durable outer surfaces and a penetrable inner core of a given thickness, to a wall comprising the steps of:

providing a wire clip having a bail portion formed in an annular shape for insertion of a wall fastener element therethrough into an anchor member of the wall, and an arm portion extending from the bail portion having a linear shape and an end dimensioned and shaped so as to allow it to be press-fitted by insertion into the thickness of the inner core of the panel only at an exposed lateral edge thereof, wherein said wire clip is shaped with said bail portion offset from said arm portion both in a lateral direction and in a thickness direction of the panel; and mounting a panel to the wall by inserting the arm portion of the wire clip into the thickness of the inner core of the panel, and positioning and fastening the bail portion of the wire clip with the wall fastening element to the anchor member of the wall, said method being used for forming a hairline joint between adjacent panels, further comprising the steps of mounting one panel to one side of the joint, undercutting the inner core and rear surface of the other panel to form an overhanging front face, inserting one-side portions of modified wire clips formed as straight linear pieces into the inner core of said one panel, aligning the other panel and sliding it toward said one panel so that exposed other-side portions of the modified wire clips are inserted into the inner core of said other panel and its overhanging front face overlaps the front surface of said one panel to form the hair line joint.

* * * * *